Nov. 12, 1946.    S. S. CRAUSE    2,410,929
CRANK AND LUBRICATED MEANS FOR DRIVING THE SAME
Filed March 2, 1944
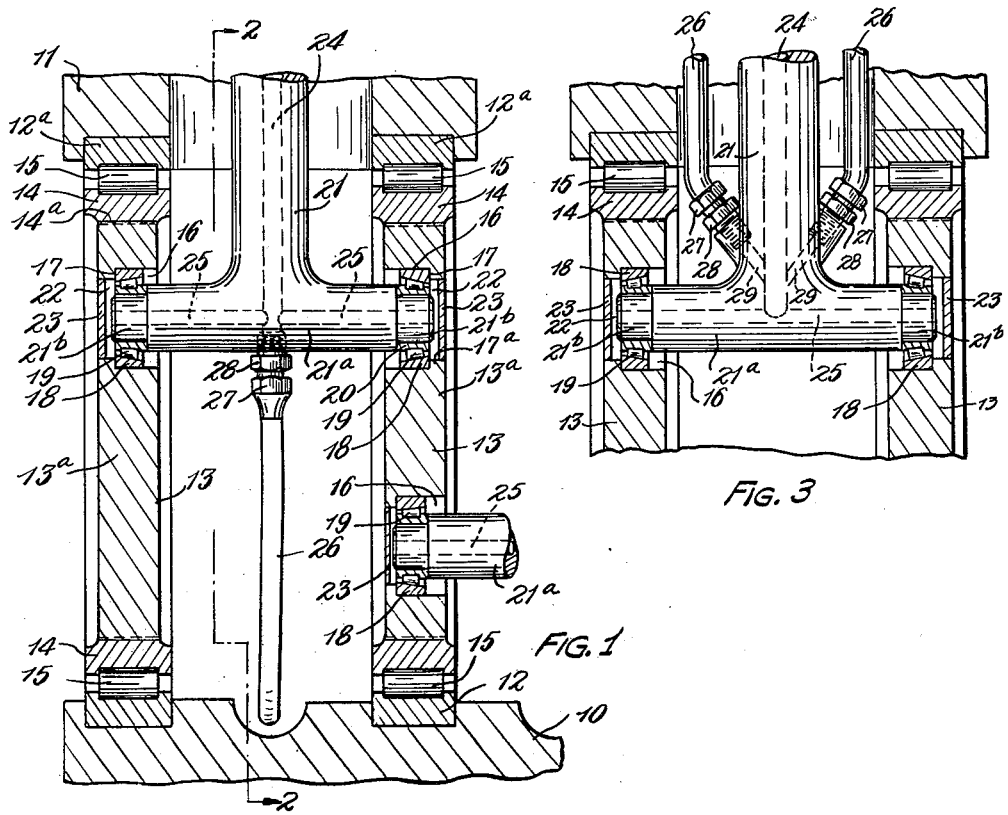
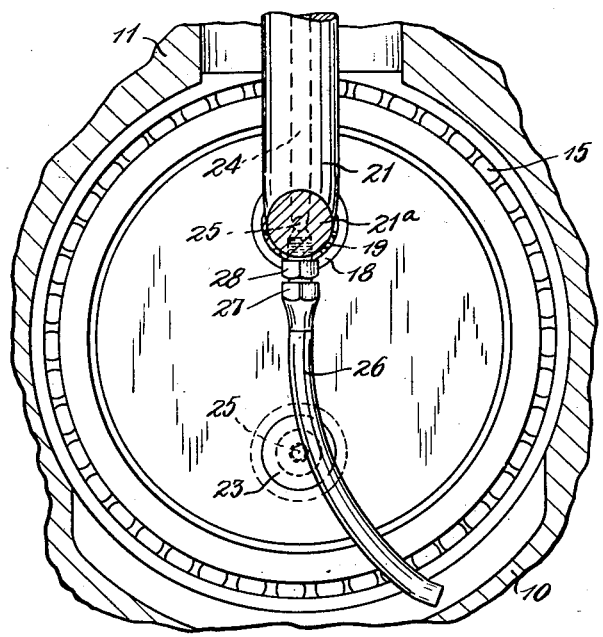
INVENTOR.
Stephen S. Crause
BY Hull & West
ATTORNEYS Patented Nov. 12, 1946

2,410,929

UNITED STATES PATENT OFFICE 2,410,929

CRANK AND LUBRICATED MEANS FOR DRIVING THE SAME

Stephen S. Crause, Cleveland, Ohio

Application March 2, 1944, Serial No. 524,806

11 Claims. (Cl. 74—605)

This invention relates to engines, and more particularly to the driving connections between engines such as are employed in driving automotive vehicles and the crankshafts of such engines. It has for one of its general objects to provide, for engines of the type wherein the connecting rods thereof are coupled to crank disks, an improved manner of constructing and supporting the crank disks; also to provide an improved manner of connecting the pins at the bases of the connecting rods with the said crank disks. A still further general object of the invention is to provide an efficient means for supplying lubricant to the bearings for said connecting rods.

I realize these objects in and through the construction and arrangement of parts shown in the drawing hereof, wherein Fig. 1 represents a fragmentary sectional view through a portion of a crankcase, illustrating the manner in which the pin at the lower end of a connecting rod is connected to a pair of adjacent crank disks and the manner in which the bearings for the ends of the connecting rod are lubricated as well as the manner in which the crank disks are constructed and mounted for rotation within the crankcase; Fig. 2 is a sectional view taken on the line 2—2 of Fig. 1 and looking in the direction of the arrows; and Fig. 3 is a fragmentary sectional view showing a modification in the manner of supplying lubricant to the bearings for the connecting rod.

Describing the various parts by reference characters, and first as shown in Figs. 1 and 2, 10 denotes generally the bottom of a crankcase and 11 a portion of the top thereof. The bottom 10 and top 11 are preferably provided with arcuate ribs 12 and 12ª projecting therefrom and adapted jointly to form the outer races 12 and 12ª of a roller bearing. 13 denotes generally each of a pair of adjacent circular crank members, each of the said members being shown herein as comprising an inner cylindrical disk member 13ª which is made of light-weight material, such as aluminum or magnesium alloy, and which, in molding, is cast within a bearing ring member 14 of metal having a lower coefficient of expansion, such as iron, and which bearing ring members constitute inner races for the rollers 15. For the purpose of securing proper interlocking between the inner disk members and the surrounding inner ring members, during the casting operation, the inner surfaces of the latter are knurled, as indicated at 14ª. By making the external bearing ring member of metal having a lower coefficient of expansion than the inner member, a permanent unison will be obtained between the bearing ring and the inner member.

Each of the inner members, except those at the extreme ends of the crank assembly, are provided with two angularly spaced cylindrical recesses 16 projecting thereinto from opposite sides thereof, for the reception of the bearings for the ends of the connecting rod pins. Each of the said recesses is provided at its outer end with a short annular shoulder 17 extending radially inwardly from the cylindrical wall of such recess, the inner wall of said shoulder constituting a stop wall for positioning the outer race ring 18 of a tapered roller bearing, the rollers whereof are indicated at 19 and the inner race ring 20 whereof surrounds a reduced end 21ᵇ of the pin 21ª at the base of the connecting rod 21. A short cylindrical wall 17ª extends outwardly from the inner end of the shoulder 17, the internal diameter of said wall being greater than the external diameter of the inner race ring 20 and the rollers 19, for purposes of assembly; this construction also provides a chamber 22 for lubricant beyond the ends of the pin and bearing, the said chamber being closed by a removable plate 23 fitted into the outer end thereof.

For the purpose of lubricating the wrist pin bearings of the connecting rod as well as the bearings wherein the outer ends of the pins 21ª are mounted, I have provided the following construction:

Each connecting rod is provided with an axial bore or passageway 24 extending upwardly to the wrist pin bearings (not shown) and also with transverse bores or passages 25 extending outwardly from the central portion thereof. As shown herein these passages are connected at their inner ends with each other and with the passage 24 and each extends axially through the pin 21ª, its outer end communicating with a chamber 22. For the purpose of supplying lubricant to these passages, I employ an oil-resistant hose 26 connected at one end with an oil pump (not shown) and having its opposite end communicating with the passages 24 and 25 by means of the connecting elements 27 and 28, the latter element being threaded into the bottom of the connecting rod and communicating with the extension of the passage 24. It will be noted that the passage 24 which leads to the wrist pin bearings is of considerably greater cross sectional area than that of the passages 25. This is due to the fact that the bearings for the ends of the pin 21ᵃ require less lubricant than is the case with the former bearings.

With the parts constructed and arranged as described, the operation will be readily understood. As the cranks revolve, the hose 26 will be free to rise and fall with the movements of the connecting rod, and lubricant can at all times be supplied therethrough to the connecting rod bearings and wrist-pin bearings. The crank disks will revolve within the roller bearings provided therefor, the latter bearings being lubricated by splash lubrication.

In Fig. 3 I have shown a modification of the means for supplying lubricant to the connecting rod bearings where the connecting rod is employed with certain types of airplane engines and wherein lubricant must be supplied to the passage 24 above the pin proper and above the point where said passage intersects the passages 25. In such installations, I employ two hose 26, each of which is connected by members 27 and 28 with a short downwardly inclined passage 29 the lower end of which communicates with the passage 24.

For convenience of description, the cylinder and piston of the engine are considered to be located above the crank disks, and the terms "upper" and "lower" and "upwardly" and "downwardly" have been employed herein but without any intention thereby of limiting the use of my invention to any particular location of the cylinder and piston with reference to the crankcase or to the bearings within which the crank disks are mounted.

Having thus described my invention, what I claim is:

1. The combination, with a pair of crank members and means for supporting the same for rotation, of a connecting rod having a pin at one end thereof, and means for connecting the opposite ends of said pin with the said members, said means comprising a seat carried by each of said members, the said seats being opposed to each other, an outer race ring member fitted within each of said seats, an inner race ring member mounted on each end of the said pin, anti-friction members interposed between the said race ring members, and means for conducting lubricant under pressure to the bearings constituted by said race ring members and said anti-friction members.

2. In the combination recited in claim 1, the means for conducting lubricant under pressure to the bearings comprising passages formed within and extending longitudinally of the pin to the said bearings, and a hose for lubricant connected with the said passages.

3. The combination, with a pair of crank members and means for supporting the same for rotation, of a connecting rod having a pin at one end thereof, and means connecting the opposite ends of said pin with the said members, said means comprising a seat carried by each of said members, the said seats being opposed to each other, anti-friction bearings mounted in said seats and within which the opposite ends of the pin are mounted, respectively, there being passages extending longitudinally of said pin and adapted to communicate at their outer ends with the said bearings, respectively, there being also a passage in the said connecting rod extending longitudinally thereof for conducting lubricant to wrist pin bearings, and a hose for lubricant connected with the said passages.

4. The combination, with a pair of crank members and means for supporting the same for rotation, of a connecting rod having a pin at one end thereof, and means for connecting the opposite ends of said pin with the said members, the said means including a recess projecting into each of said members from the pin-receiving surface thereof, a short shoulder projecting radially inwardly from the outer end of each of said recesses and providing a stop wall at the outer end of such recess, the said shoulder having an interior wall extending outwardly through the opposite surface of the member, an outer race ring member fitted within each recess and abutting the stop wall formed by the shoulder in said recess, an inner race ring member mounted on each end of the said pin, anti-friction members interposed between the race ring members, and a cover removably mounted within the interior of each of said shoulders, the internal diameter of each shoulder being greater than the external diameter of the inner race ring member and the anti-friction devices supported thereby.

5. The combination, with a pair of crank members and means for supporting the same for rotation, of a connecting rod having a pin at one end thereof, and means for connecting the opposite ends of said pin with the said members, the said means including a recess projecting into each of said members from the pin-receiving surface thereof, a short shoulder projecting radially inwardly from the outer end of each of said recesses and providing a stop wall at the outer end of such recess, the said shoulder having an interior wall extending outwardly through the opposite surface of the member, an outer race ring member fitted within the recess and abutting the stop wall formed by the shoulder in said recess, an inner race ring member mounted on each end of the said pin, anti-friction members interposed between the race ring members, a cover removably mounted within the interior of each of said shoulders and each spaced from the outer end of the pin adjacent thereto thereby to provide a chamber beyond the outer end of each of said pins, the internal diameter of each shoulder being greater than the external diameter of the inner race ring member and the anti-friction devices supported thereby, and means for conducting lubricant to the said chambers.

6. In the combination set forth in claim 5, the means for conducting lubricant to the said chambers comprising passages for lubricant extending longitudinally of said pin and through the outer ends thereof and communicating respectively with the chambers provided between the outer ends of the pin and the covers.

7. The combination, with a pair of crank members and means for supporting the same for rotation, of a connecting rod having a pin at one end thereof, and means for connecting the opposite ends of said pin with the said members, the said means including a recess projecting into each of said members from the pin-receiving surface thereof, a short shoulder projecting radially inwardly from the outer end of each of said recesses and providing a stop wall at the outer end of such recess, the said shoulder having an interior wall extending outwardly through the opposite surface of the member, an outer race ring member fitted within each recess and abutting the stop wall formed by the shoulder in said recess, an inner race ring member mounted on each end of the said pin, anti-friction members interposed between the race ring members, and a cover removably mounted within the interior of each of said shoulders and each spaced from the outer end of the pin adjacent thereto thereby to provide a chamber beyond the outer end of each of said pins, the said pin having passages therein extending longitudinally thereof and communicating at their outer ends, respectively, with the chambers formed beyond the outer ends of the pin, and means for conducting lubricant to said passages, said means comprising a hose for such lubricant supply, and means for connecting the delivery end of said hose with the said passages.

8. In the combination recited in claim 7, the connecting rod being provided with a passage extending longitudinally thereof for supplying lubricant to wrist pin bearings and the said passage communicating with the first mentioned passages and with the delivery end of said hose.

9. The combination, with a pair of crank members and means for supporting the same for rotation, of a connecting rod having a pin at one end thereof, and means connecting the opposite ends of said pin with the said members, said means comprising a seat carried by each of said members, the said seats being opposed to each other, anti-friction bearings mounted in said seats and within which the opposite ends of the pin are mounted, respectively, the said pin having a bore extending longitudinally therethrough and providing passages extending from the central portion thereof through the outer ends of said pin and adapted to communicate at their outer ends with the said bearings, respectively, and the connecting rod having a passage formed therein and extending longitudinally thereof and intersecting the said bore at its lower end, there also being passages extending through opposite sides of the connecting rod and communicating with the passage extending longitudinally thereof at a point above its intersection with the said bore, and hose connected with the passages which extend through opposite sides of the connecting rod and which communicate with the bore extending longitudinally thereof.

10. The combination, with a pair of crank members and means for supporting the same for rotation, of a connecting rod having a pin at one end thereof, and means for connecting the opposite ends of said pin with the said crank members, said means comprising opposed anti-friction bearings carried by the said crank members and within which opposite ends of the said pin are mounted, there being chambers provided in said crank members beyond the anti-friction bearings, and the pin having passages for lubricant extending longitudinally thereof to said chambers, respectively, and means for conducting lubricant through said passages to said chambers.

11. The combination, with a pair of crank members and means for supporting the same for rotation, of a connecting rod having a pin at one end thereof, and means for connecting the opposite ends of said pin with the said crank members, said means comprising opposed anti-friction bearings carried by the said crank members and within which opposite ends of the said pin are mounted, there being passages extending longitudinally of said pin and adapted to communicate at their outer ends with the said bearings respectively, and means for conducting lubricant to said passages.

STEPHEN S. CRAUSE.